United States Patent [19]

Sugimura

[11] Patent Number: 5,123,662
[45] Date of Patent: Jun. 23, 1992

[54] O-RING MOUNTING GROOVE AND BACKUP RING

[76] Inventor: Nobuyuki Sugimura, 3-27, Mabasekita, Shimizu-shi, Shizuoka-ken, Japan

[21] Appl. No.: 577,682

[22] Filed: Sep. 4, 1990

[51] Int. Cl.⁵ .................................. F16J 15/34
[52] U.S. Cl. .......................... 277/169; 277/177; 277/188 R
[58] Field of Search ............. 277/169, 188 R, 188 A, 277/173, 176, 177, 203, 167, 168, 165

[56] References Cited

U.S. PATENT DOCUMENTS

| | | | |
|---|---|---|---|
| 2,115,383 | 4/1938 | Christensen | 277/177 |
| 2,227,838 | 1/1941 | Main | 277/177 |
| 2,259,422 | 10/1941 | Karlberg | 277/169 |
| 2,314,683 | 3/1943 | Berry | 277/177 |
| 2,360,731 | 10/1944 | Smith | 277/177 |
| 2,420,104 | 5/1947 | Smith | 277/177 |
| 2,462,586 | 2/1949 | Whittingham | 277/188 R |
| 2,593,193 | 4/1952 | Rockwell | 277/177 |
| 2,747,954 | 5/1956 | Damm et al. | 277/188 A |
| 2,749,193 | 6/1956 | Traub | 277/188 A |
| 2,809,080 | 10/1957 | Mittell et al. | 277/188 A |
| 3,023,014 | 2/1962 | Donner | 277/173 |
| 3,362,720 | 1/1968 | Henry et al. | 277/176 |
| 3,394,941 | 7/1968 | Traub | 277/188 R |
| 3,455,566 | 7/1969 | Hull et al. | 277/188 R |
| 4,544,167 | 10/1985 | Giroux | 277/177 |
| 4,613,348 | 9/1986 | Fournier | 277/188 R |
| 4,674,754 | 6/1987 | Lair et al. | 277/188 R |

FOREIGN PATENT DOCUMENTS 2094905  9/1982  United Kingdom ............ 277/173

*Primary Examiner*—William A. Cuchlinski, Jr.
*Assistant Examiner*—Daniel G. DePumpo
*Attorney, Agent, or Firm*—Wood, Phillips, VanSanten, Hoffman & Ertel

[57] ABSTRACT

An O-ring mounting groove has a bottom surface, which is formed as a recess whose section has an arc-like configuration so as to prevent concentration of stress. A backup ring, which is to be fitted into this O-ring mounting groove, has a lower surface whose configuration is in conformity with the bottom surface of the O-ring mounting groove, so that, when an axial force is applied to the backup ring, it is pushed outwardly.

1 Claim, 4 Drawing Sheets

O-RING MOUNTING GROOVE AND BACKUP RING

BACKGROUND OF THE INVENTION

This invention relates to an O-ring mounting groove to be formed in a shaft or the like, and a backup ring.

FIG. 6, shows an O-ring 2 and a backup ring 3, which are used for the purpose of sealing a shaft 1. These rings 2 and 3 are fitted into an O-ring mounting groove 4, the bottom surface of which is parallel with the outer periphery of the shaft.

In the example shown in FIG. 6, a rotation of the shaft 1 causes a torsional or a bending force to be generated, with the result that stress is concentrated on the O-ring mounting groove 4, which causes this groove 4 to become subject to distortion.

When distortion occurs to this section, stress is concentrated on a corner section 1a of the bottom of the O-ring mounting groove 1a, with the result that fatigue failure often occurs at this corner section 1a, where the shaft 1 will break. Thus, the conventional O-ring mounting groove has a poor fatigue characteristic, so that the service life of the shaft 1 is often very short.

Apart from this, the conventional backup ring 3 has the following problem: if the O-ring 2 is deformed by a pressurizing force applied thereto, part of the O-ring 2 can get into the gap between the backup ring 3 and the associated bearing 5, which will cause the O-ring 2 to break. Accordingly, the O-ring cannot enjoy a long service life.

SUMMARY OF THE INVENTION

It is accordingly an object of this invention to improve the fatigue characteristic of an O-ring mounting groove. Another object of this invention is to lengthen the service life of an O-ring.

In accordance with this invention, an O-ring mounting groove has an arc-like bottom surface with arc-like corner sections, so that, if a torsional or a bending force is applied to a corner section of the O-ring mounting groove and causes distortion to occur to the associated shaft, this distortion will be dispersed gently over a wide area of the arc-like bottom surface of the groove. Accordingly, there is no concentration of stress on a part of the corner section.

Further, the lower surface of the backup ring of this invention has a configuration which is generally in conformity with the arc-like bottom surface of the O-ring mounting groove, so that, when a liquid is pressed against the backup ring through the intermediation of the O-ring, the backup ring moves along the bottom surface of the O-ring mounting surface and, at the same time, receives an outward radial force, which causes it to be forced outwards. As a result, the gap between the backup ring and the bearing becomes smaller, thereby preventing part of the O-ring from getting into this gap.

DETAILED DESCRIPTION OF THE PREFERRED EMBODIMENTS

Figure 1:
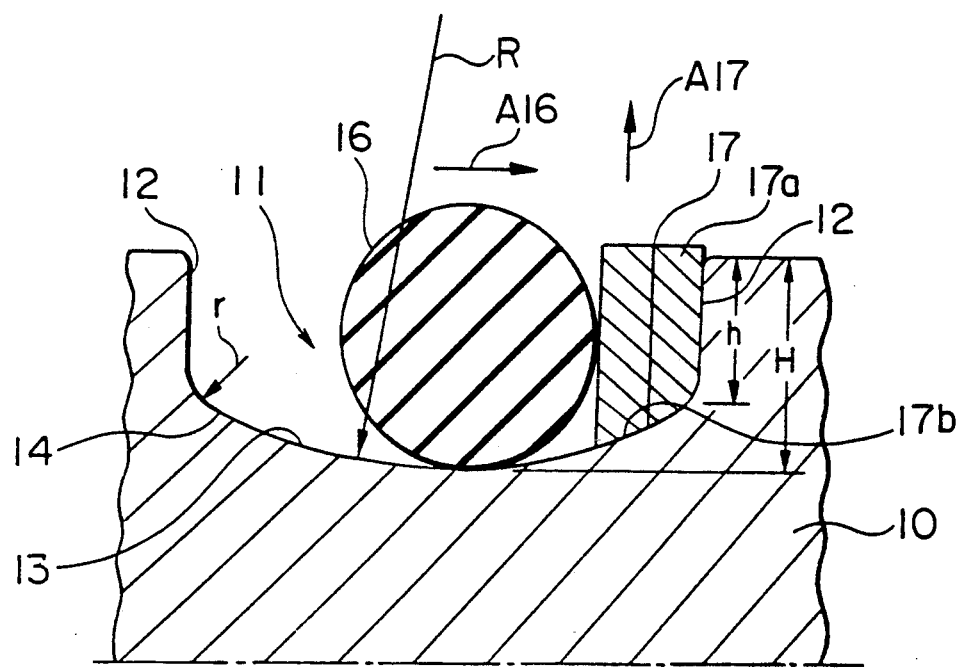
FIG. 1 is a longitudinal sectional view showing an embodiment of this invention.
Figure 2:
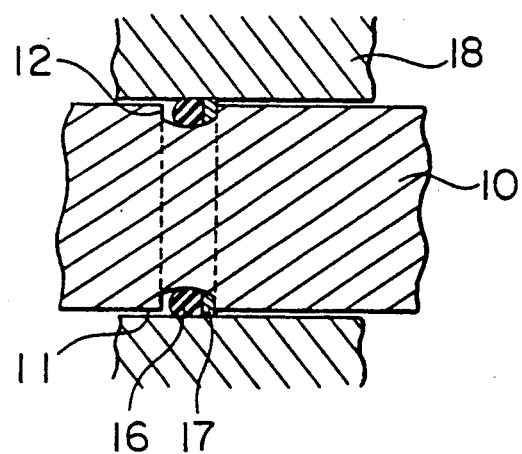
FIG. 2 is a longitudinal sectional view showing the embodiment in use.

An embodiment of this invention will now be described with reference to FIGS. 1–4, 7 and 8. In the drawings, the same reference numerals indicate the same components with the same functions.

An annular O-ring mounting groove 11 is formed around a shaft 10. This groove 11 has vertical side walls 12 and an arching bottom surface 13, which is equipped with bottom corner sections 14. The radius r of the bottom corner sections 14 is set as prescribed in JIS (the standard radius of a bottom corner section in an O-ring groove) and the radius R of the arching bottom surface 13 is set to be 5 to 20 times larger than the radius r of the bottom corner sections 14, i.e., it is appropriately set within the range: 5r to 20r.

The depth H of the O-ring mounting groove 11 is set as prescribed in JIS (the standard depth) and the depth h of the groove bottom surface 13 is set to be ¾ or less of the standard depth H, i.e., it is set within the range: ¾H or less. A backup ring 17 is fitted between one of the side walls 12 and an O-ring 16, which is fitted into the O-ring mounting groove 11.

In order to facilitate its fitting, this backup ring 17 is formed as a helical ring, which, however, should not necessarily be so. The lower surface 17b of this backup ring 17 has a configuration which is generally in conformity with the groove bottom surface 13.

Next, the operation of this embodiment will be described. A rotation of the shaft 10, which is supported by a bearing 18, causes torsion to occur at the neck portion of the shaft 10, where the O-ring is formed, thereby causing a distortion which is attributable to bending. Due to the arc-like configuration of the bottom surface 13, this distortion is dispersed gently over a wide area of the bottom surface 13. The occurrence of this distortion is repeated during the rotation of the shaft 10, until fatigue failure occurs at the deepest section of the bottom surface 13, i.e., the thinnest section of the shaft neck portion, where the shaft breaks.

If a pressurizing force in the direction indicated by arrow A16 is applied to the O-ring 16, the backup ring 17 is pressed in the same direction. At the same time, however, a force indicated by arrow A17 is applied to the backup ring 17. Then, the groove bottom surface 13, which has an arc-like configuration, causes the lower surface 17b of the backup ring 17 to be deformed into an arc-like surface, the upper surface 17a of the backup ring 17 coming near to the bearing 18. Accordingly, the gap between the upper surface 17a of the backup ring 17 and the bearing 18 becomes smaller, so that, if the O-ring 18 is deformed, no part thereof is allowed to enter this gap.

Figure 5:
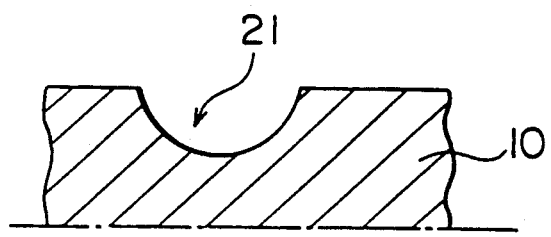
FIG. 5 is a longitudinal sectional view showing another embodiment of this invention.
Figure 6:
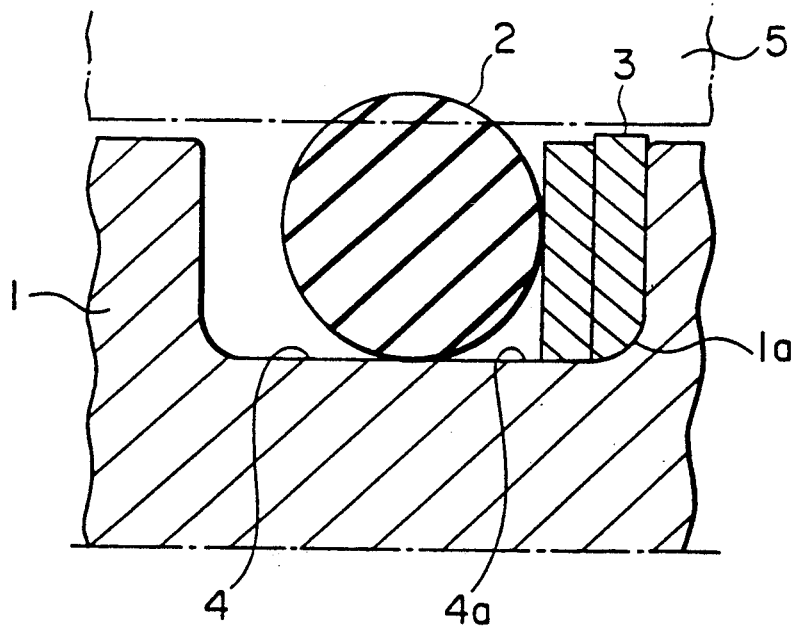
FIG. 6 is a longitudinal sectional view showing a prior art example.
Figure 7:
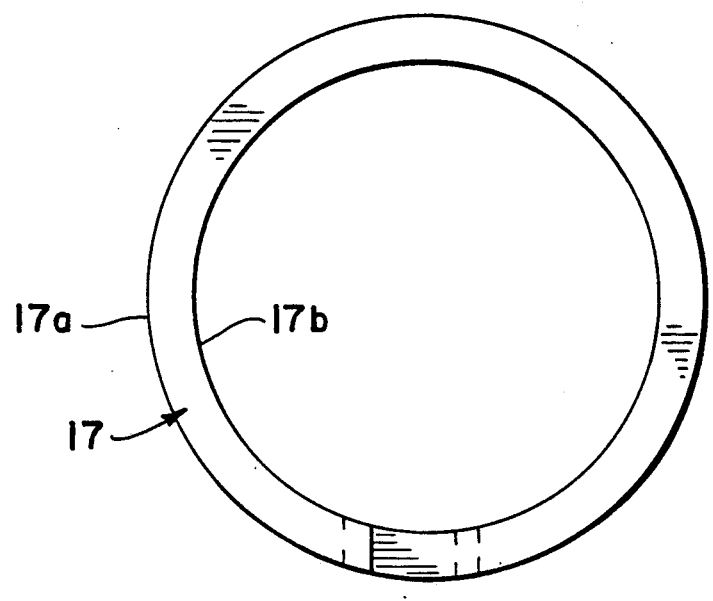
FIG. 7 is a plan view of a helical backup ring.
Figure 8:
FIG. 8 is a side-elevational view of the helical backup ring illustrated in FIG. 7.

The above description of the embodiment should not be construed as restrictive. It is also possible, for example, to form an O-ring mounting groove 21 such that, not only its bottom surface but also the entire groove has an arc-like section, as shown in FIG. 5.

As described above, the O-ring mounting groove of this invention has a groove bottom surface which is formed as a recess having an arc-like section, so that, if a torsional or a bending force is repeatedly applied to that section of the associated shaft where the O-ring mounting groove is formed, the distortion caused by this force is gently dispersed over a wide area of the groove bottom surface.

Thus, unlike the prior art example described above, no concentration of stress, and consequently, no concentration of distortion occurs at a bottom surface corner, so that the shaft is prevented from breaking at this corner.

Figure 3:
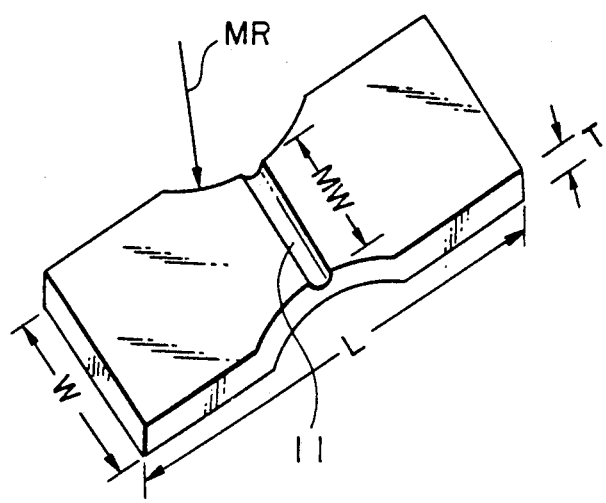
FIG. 3 is a perspective view showing a test piece for a bending test.
Figure 4:
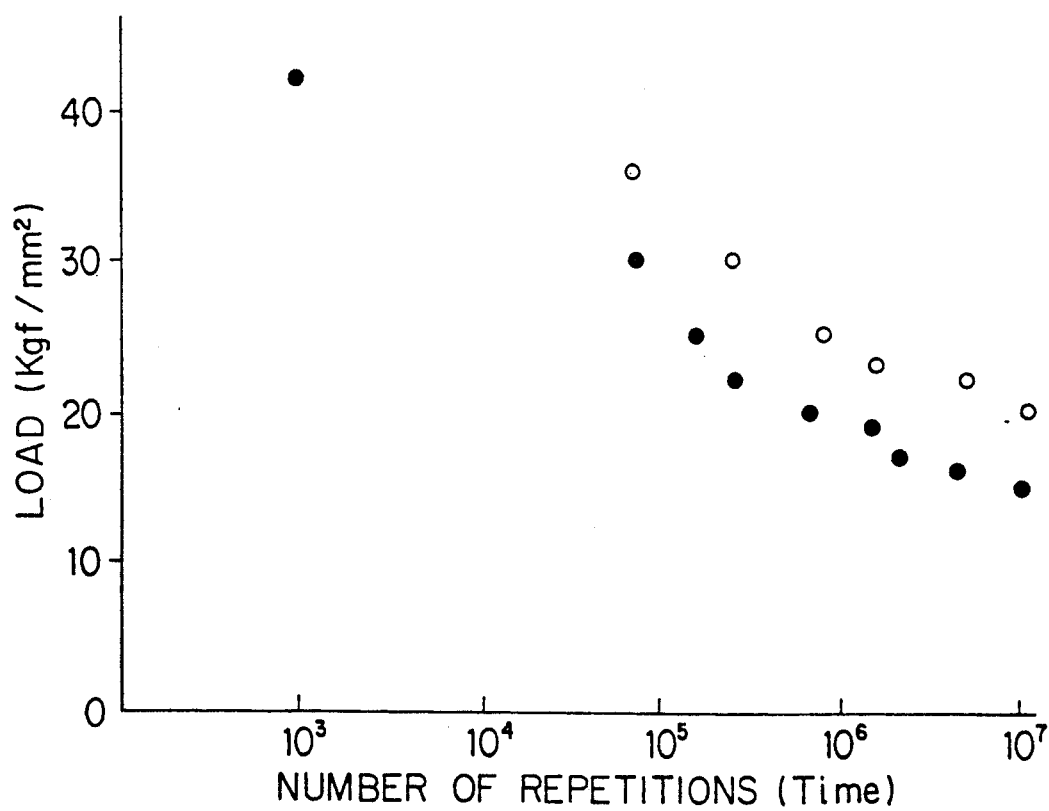
FIG. 4 is a graph showing the results of a bending fatigue test.

Accordingly, this invention provides an improved fatigue characteristic as compared to the prior art example, allowing the shaft to enjoy a longer service life. In order to demonstrate the difference between this invention and the prior art, a bending fatigue test was conducted using platelike test pieces as shown in FIG. 3. FIG. 4 shows the results of this test. Each test piece used had a length L of 95 mm, a width W of 38 mm, a thickness T of 8 mm, a middle (neck) portion radius MR of 26 mm, and a middle section width MW of 25 mm.

In FIG. 4, the vertical axis represents the load ($Kgf/mm^2$) and the horizontal axis represents the number or repetitions. ● and ○ respectively represent the test results of the test piece with a configuration according to the prior art and those of the test piece with a configuration according to this invention.

As is apparent from this drawing, the present invention provides a substantially improved fatigue characteristic. For example, with the test piece according to the prior art, the number or repetitions when the repeated load was 15 $Kgf/mm^2$ was $1.16 \times 10^7$, whereas, with the test piece according to this invention, the number or repetitions when the repeated load was 21 $Kgf/mm^2$ was $1.15 \times 10^7$. Thus, with this invention, the repeated load with respect to substantially the same number or repetitions is much greater than that of the prior art. Furthermore, since the lower surface of the backup ring of this invention has a configuration in conformity with the bottom surface of the O-ring mounting groove, which is formed as an arc-like recess, pressing the associated O-ring against the backup ring generates a force which pushes the backup ring outwardly. As a result, the gap between the backup ring and the associated bearing becomes smaller, so that, if the O-ring is deformed, no part thereof is allowed to enter this gap.

Accordingly, the O-ring is protected from breakage, thus allowing the O-ring to enjoy a longer service life.

What is claimed is:

1. An annular O-ring mounting groove which is formed in a shaft rotatable in a bearing, comprising a groove bottom surface with a section having an arc-like configuration with arcuate bottom corner sections on each side of the groove bottom surface, said corner sections having a selected radius in section, wherein the groove bottom surface has a radius which is 5 to 20 times larger than the selected radius of the corner sections, thereby preventing stress concentrations from occurring.

* * * * *

UNITED STATES PATENT AND TRADEMARK OFFICE
CERTIFICATE OF CORRECTION

PATENT NO. : 5,123,662

DATED : June 23, 1992

INVENTOR(S) : Nobuyuki Sugimura

It is certified that error appears in the above-identified patent and that said Letters Patent is hereby corrected as shown below:

Title page, insert item [30],

--Foreign Application Priority Data

Sep. 22, 1989    Japan........................247640/1989--.

Signed and Sealed this

Fourteenth Day of September, 1993

*Attest:*

BRUCE LEHMAN

*Attesting Officer*     *Commissioner of Patents and Trademarks*